(No Model.) 2 Sheets—Sheet 1.

A. WURTS.
LIGHTNING ARRESTER.

No. 476,855. Patented June 14, 1892.

(No Model.) 2 Sheets—Sheet 2.

A. WURTS.
LIGHTNING ARRESTER.

No. 476,855. Patented June 14, 1892.

Witnesses
George Bourn Jr.
R. C. Tener

Inventor
Alexander Wurts.
By his Attorney
Charles A. Terry

UNITED STATES PATENT OFFICE.

ALEXANDER WURTS, OF PITTSBURG, PENNSYLVANIA, ASSIGNOR TO THE WESTINGHOUSE ELECTRIC AND MANUFACTURING COMPANY, OF SAME PLACE.

LIGHTNING-ARRESTER.

SPECIFICATION forming part of Letters Patent No. 476,855, dated June 14, 1892.

Application filed January 21, 1892. Serial No. 418,764. (No model.)

*To all whom it may concern:*

Be it known that I, ALEXANDER WURTS, a citizen of the United States, residing in Pittsburg, county of Allegheny, State of Pennsylvania, have invented a new and useful Improvement in Systems of Electrical Distribution and Methods of Protecting the Same, (Case No. 481,) of which the following is a specification.

The invention relates to the class of apparatus employed for protecting extended electric circuits from injury by reason of atmospheric or static discharges. The object of the invention is to provide reliable and efficient means for preventing injury to electrical apparatus by reason of these discharges, which are especially liable to take place during the prevalence of thunder-storms or other atmospheric electrical disturbances. In practice it is found that it is exceedingly difficult to prevent a lightning discharge or other heavy static charge upon a line from passing through the generators, motors, or other translating devices connected therewith, and it is necessary to provide the best possible means for bringing about an equilibrium between the electrical potentials upon and in the immediate vicinity of the line and that of the earth.

I have found that by passing a conductor through a conducting medium—such, for instance, as a body of water—and forming a good electrical connection between the vessel containing the same and the earth electric currents of considerable potential may be caused to pass through the conductor without material leakage, even though the other pole of the system be grounded, and yet a sufficiently good conduction to earth will be afforded for currents of very high potential—such, for instance, as atmospheric discharges. I make use of this feature in a manner which will be fully described in connection with the accompanying drawings; and my invention may be stated to consist generally in connecting in series with an electric circuit a conductor embedded in the earth. The conductor thus connected in series is preferably formed into a coil in such manner as to tend to oppose the passage of oscillatory discharges.

Figure 1:
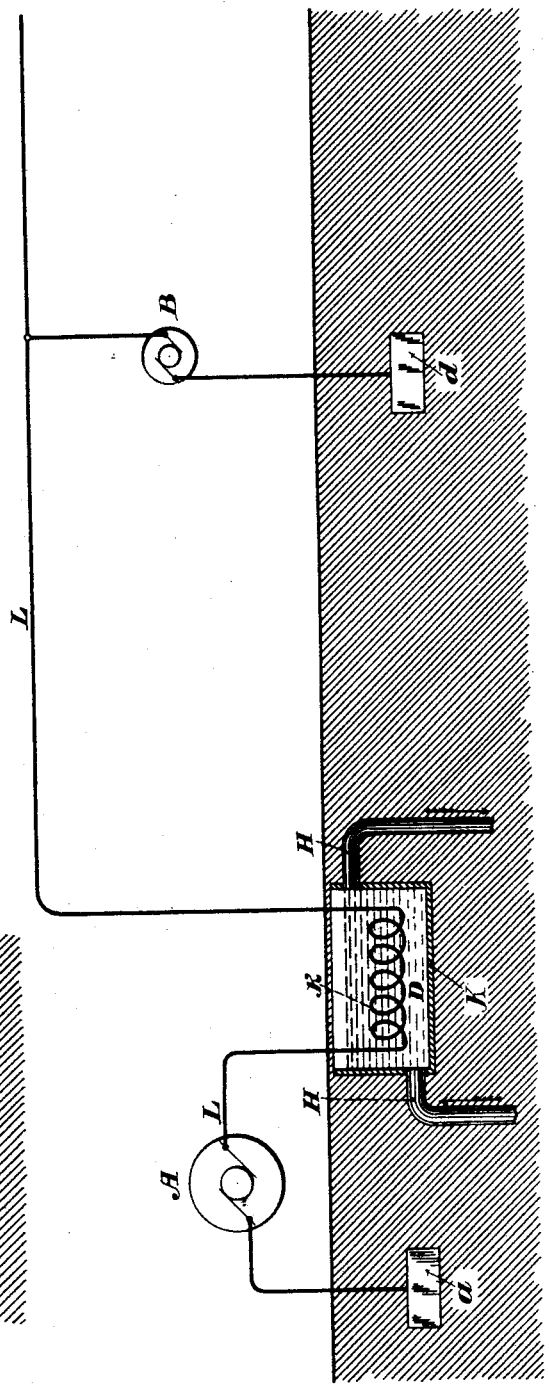
Figure 2:
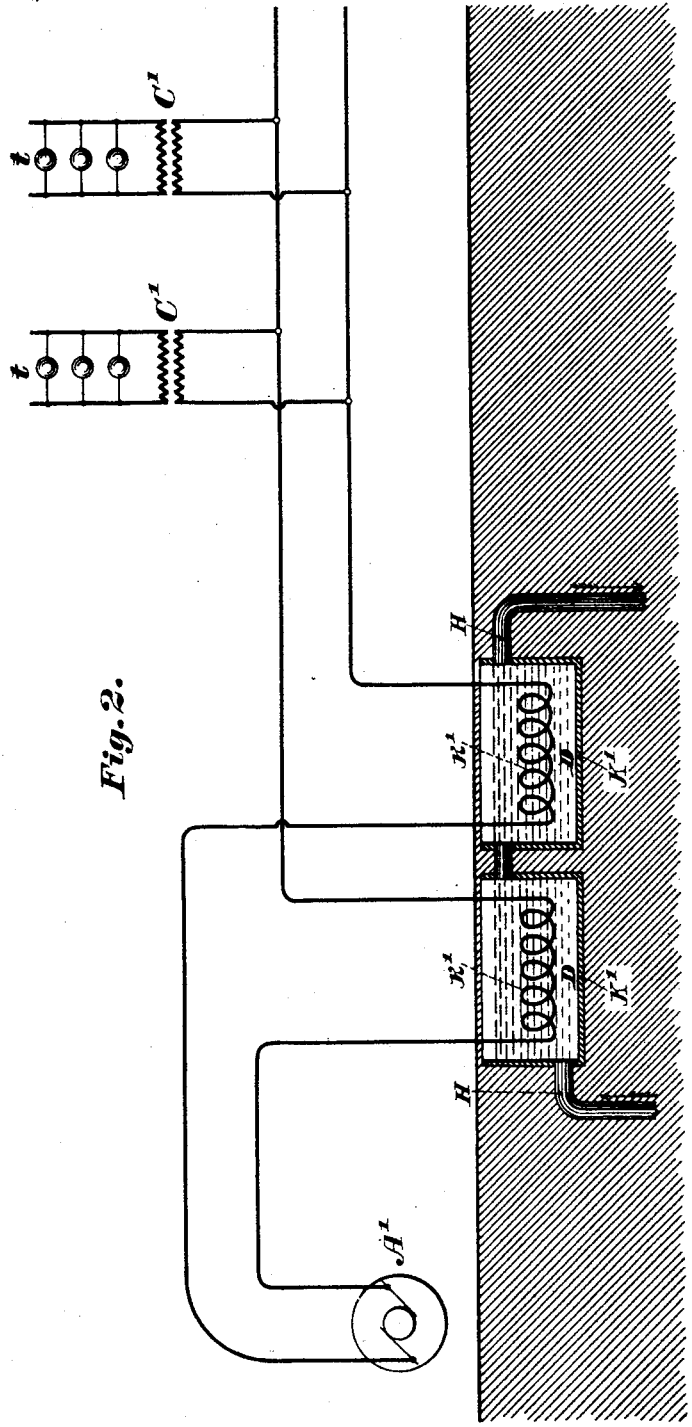

In the accompanying drawings, Figure 1 is a theoretical diagram illustrating the application of the invention to a continuous-current system—such, for instance, as an electric railway—and Fig. 2 illustrates the application of the invention to a system employing a metallic circuit—such, for instance, as an alternating-current system of distribution. Fig. 3 illustrates a modification.

Referring to Fig. 1, A represents a generator of continuous electric currents, and L the main-line conductor—for instance, a trolley wire leading from the generator along the line of the railway. This conductor is laid from the generator through a tank K, containing some suitable conducting material — such, for instance, as water. From this it passes onto the line-circuit. The portion $k$ of the circuit which is contained within the tank may be, and preferably is, wound into a coil or solenoid for the purpose of affording as much impedance as practicable to currents of the character of static or lightning or atmospheric discharges. The tank itself is formed with a wall D of good conducting material for the purpose of forming as perfect an electrical connection with the earth as possible. It may be connected with water-mains H H and be supplied with water therefrom. This may be accomplished by embedding the entire tank in the earth or in any other suitable and convenient manner. The apparatus supplied with current from this circuit is located beyond the tank K, as indicated by the electric motor B, for instance, and the circuit connections are continued from the conductor L through the motor to the earth, as indicated at $d$, one pole of the generator A being also connected with the earth, as indicated at $a$.

Instead of employing a grounded main-line circuit such as shown in Fig. 1, a complete metallic circuit may be employed, as shown in Fig. 2. In this instance an alternating-current generator A' is shown, although a continuous-current machine may be employed. The work-circuit consists of two main-line conductors passing from the respective poles of the generator to such points as may be desired for supplying a work-circuit—such, for instance, as a number of converters C' C', the primaries of which are shown as connected in parallel, while the secondaries supply translating devices $t$—such, for instance, as incandescent lamps. A coil $k'$ is connected in series with each line and these coils are located in tanks $K'$ in the same manner as described in connection with Fig. 1. The tanks themselves are connected with the earth.

It is found in practice that with low potentials and by reason of the relatively poor contact that under the most favorable circumstances can be made with the earth very little current will leak through the liquid or other conducting material surrounding the coils so long as only the normal potential is upon the circuit. When, however, the line receives an abnormal charge from the atmosphere, such charge will be compelled to pass through the coils embedded in the tank or earth before passing back to the generator, and the impedance offered by the coils tends to oppose the flow of the discharge and at the same time the best possible means are provided for such charges to dissipate themselves in the earth, the water offering large surface for the discharge to distribute itself through. Thus the greater portion of the discharge will take place to the water and thus be prevented from passing back to the generator. In this manner there will always be provided the best possible means for discharging the circuit and for protecting the generator supplying the system and practically no current loss will be incurred during the normal operation of the plant.

It will be noticed that in the present system the main-line conductor is itself practically led through the ground, whereas in the methods heretofore employed for protection against lightning discharges there have been provided branch circuits or taps having in some of them air-gaps or other means for preventing currents of normal potential from traversing them. When, therefore, a discharge takes place on a system thus provided with tapped circuits a large proportion of the discharge is liable to pass back to the dynamo independently of the grounded circuits. In my invention, however, the discharge is compelled to pass through the ground before it can reach the dynamo.

In Fig. 3 the main-line conductor, instead of passing through a tank of water, is buried directly in damp earth, cinders, or otherwise grounded in any of the well-known manners usually employed in grounding lightning-rods, &c.

I claim as my invention—

1. The combination, with an electric generator and translating devices supplied with current therefrom, of an aerial electric conductor through which the current from the generator is transmitted to the translating devices and a bare conductor embedded in the earth and interposed between the aerial conductor and the generator, substantially as described.

2. The combination, with an electric generator and translating devices supplied with current therefrom, of an aerial electric conductor through which currents are transmitted to the translating devices and a bare conductor interposed between the aerial conductor and the generator and embedded in a well-grounded conducting medium, substantially as described.

3. The combination, with an electric circuit, of a bare conductor connected in series with the circuit and embedded in a well-grounded conducting medium, said bare conductor being formed into a coil.

4. The combination, with a source of electric currents, of a main-line conductor leading therefrom, a vessel of conducting material electrically connected with the earth, a conducting medium contained therein, and a bare electric conductor surrounded by the said conducting medium and connected in series with the main-line circuit.

5. The combination, with a source of electric currents, of a main-line conductor leading therefrom, a vessel of conducting material electrically connected with the earth, a conducting medium contained therein, and a coiled bare electric conductor surrounded by the same and connected in series with the main line of the circuit.

6. The combination, with an electric-railway system, of a generator, a trolley-wire supplied from said generator, and a section of bare wire embedded in the earth, through which a permanent electrical connection is formed between the trolley-wire and the generator.

7. The combination of parallel aerial conductors, translating devices supplied therefrom, a generator for supplying currents to the said conductors, and well-grounded bare conductors interposed between each of said parallel conductors and the corresponding terminals of the machine, substantially as described.

In testimony whereof I have hereunto subscribed my name this 18th day of January, A. D. 1892.

ALEXANDER WURTS.

Witnesses:
FRANCIS E. J. LITOT,
JAMES WM. SMITH.